Dec. 9, 1969     W. BACHMANN     3,482,664
WHEEL BRAKE CYLINDER WITH SELF-ADJUSTING MECHANISM
Filed Sept. 20, 1967     3 Sheets-Sheet 1

WILLI BACHMANN
*INVENTOR.*

BY *Karl F. Ross*

ATTORNEY

Dec. 9, 1969   W. BACHMANN   3,482,664
WHEEL BRAKE CYLINDER WITH SELF-ADJUSTING MECHANISM
Filed Sept. 20, 1967   3 Sheets-Sheet 2
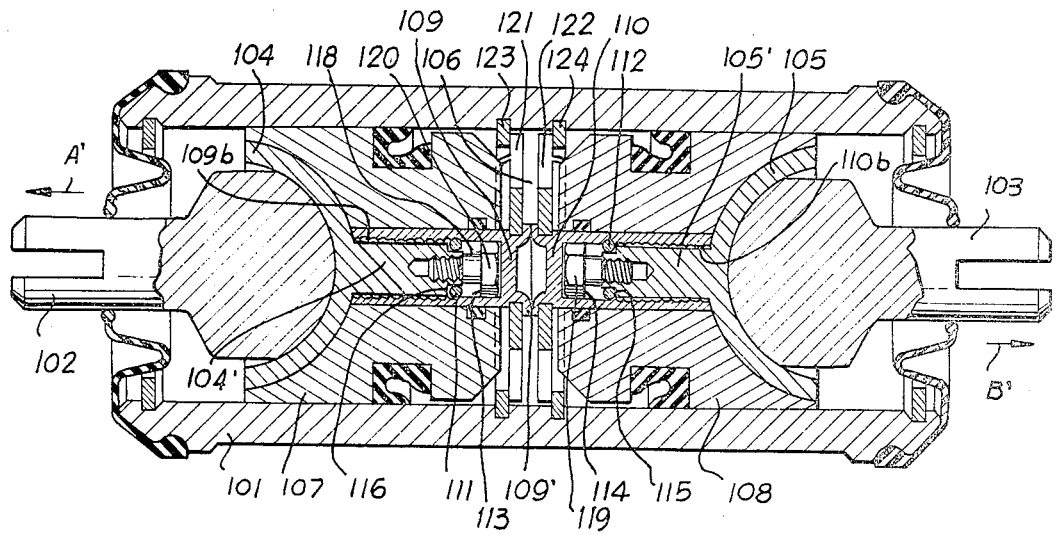
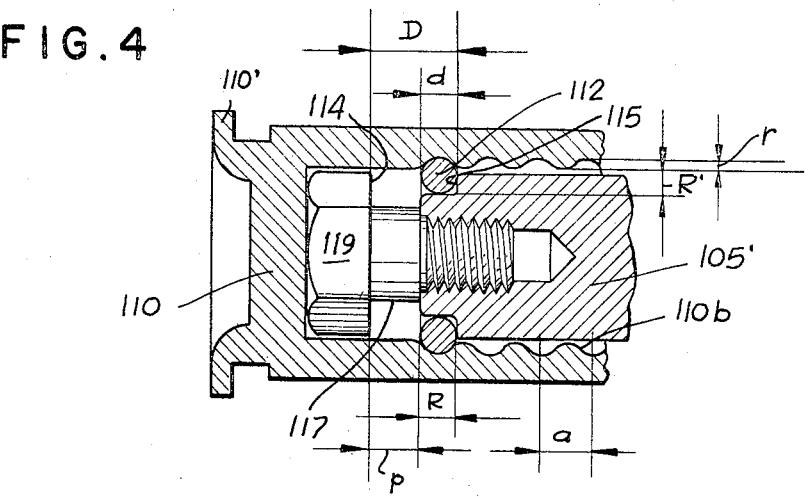
WILLI BACHMANN
INVENTOR.
BY   *Karl J. Ross*
ATTORNEY

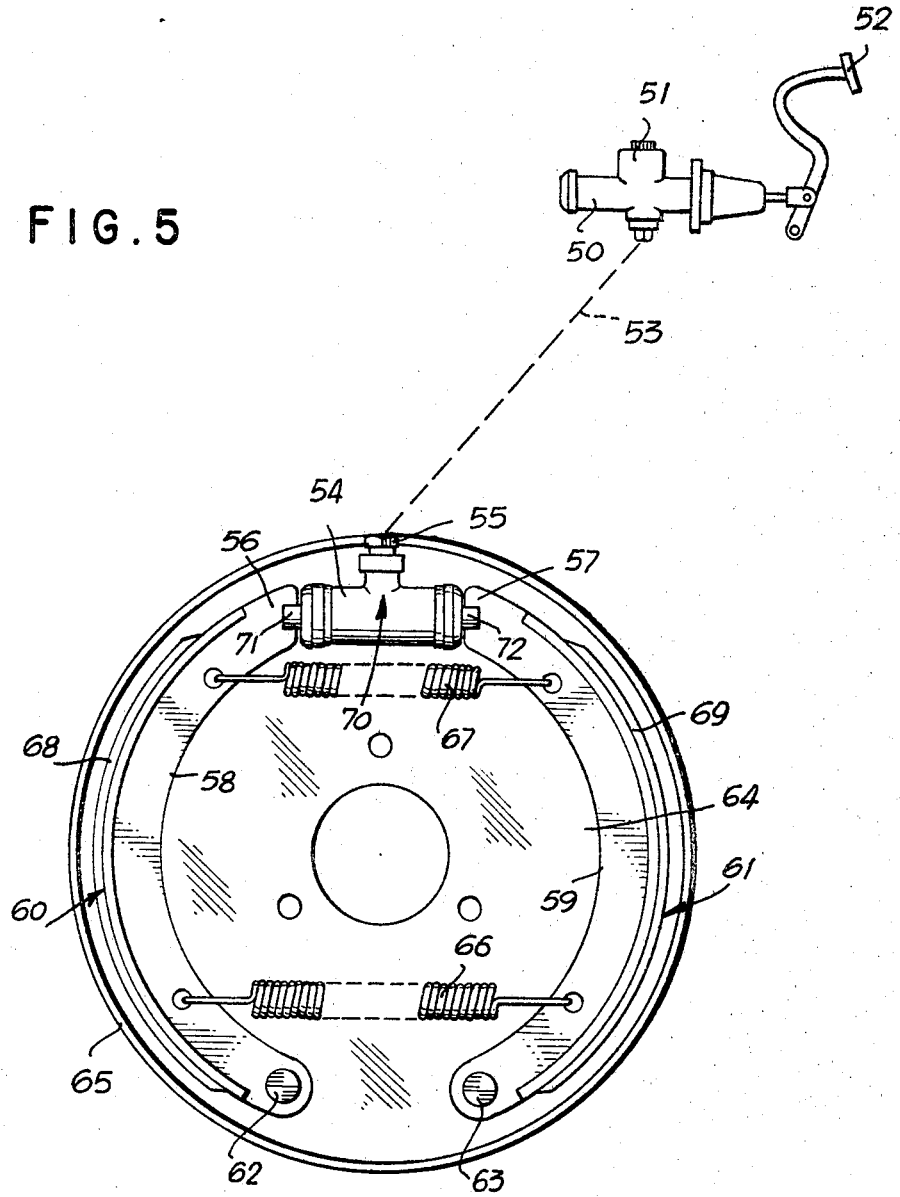

United States Patent Office 3,482,664
Patented Dec. 9, 1969

1

3,482,664
WHEEL BRAKE CYLINDER WITH SELF-ADJUSTING MECHANISM
Willi Bachmann, Grosskarben, Bad Vilbel, Germany, assignor to Alfred Teves GmbH, Frankfurt am Main, Germany, a corporation of Germany
Filed Sept. 20, 1967, Ser. No. 669,190
Claims priority, application Germany, Oct. 6, 1966, T 32,204
Int. Cl. F16d 51/52, 65/58
U.S. Cl. 188—196    9 Claims

ABSTRACT OF THE DISCLOSURE

A self-adjusting mechanism for re-establishing original brake play by compensating the rest position of a brakeshoe for brake-lining wear in which an elongated axially extending adjusting member is coaxially and slidably received in the piston of the wheel-brake cylinder and is formed internally or externally with an array of axially spaced radially open annular recesses in which a spring ring is partly recessed while the piston has a pair of abutments forming a lost-motion linkage with the ring, the abutment effective in the direction of movement of the piston to actuate the brake cams the ring against its resilient force from recess to recess while the other abutment has a configuration such that it restricts movement of the ring outwardly from its recess upon axial engagement therewith.

---

My present invention relates to automotive-brake systems and, more particularly, to a wheel-brake cylinder with a self-adjusting mechanism for compensating for brake-lining wear.

It has become general practice, in working with wheel-brake cylinders for automotive-vehicle braking systems, to provide self-adjusting mechanisms for resetting the rest position of a brakeshoe to compensate for changes in the brake "play" resulting from wear of the brake lining. In so-called "internal-expansion" or "drum-type" brakes, for example, the wheel-brake arrangement comprises a brake shield affixed to the axle housing or other relatively stationary part of the vehicle chassis and carrying a pair of generally sectoral brakeshoes conforming to a cylindrical surface. The rotating member of the brake is a brake drum which encloses the brake shield and is coupled with the wheel disk of the vehicle by bolts or the like and may be mounted upon the axle driving this wheel. The drum has a cylindrical inner periphery engageable by the brakeshoes which are pressed outwardly thereagainst by a wheel-brake cylinder whose axis is generally parallel to the plane of the brakeshoe and perpendicular to the axis of rotation of the drum. In some cases, e.g. simplex brakes, a pair of wheel-brake cylinders receive respective pistons which apply pressure via force-transmitting members or links to the respective brakeshoes, while other assemblies (e.g. duplex brakes) provide a tandem cylinder in which a pair of pistons are relatively shiftable in the axial direction by the introduction of hydraulic fluid into a compartment defined between them. Furthermore, the brakeshoes may in "servo" brakes in part shift so as to be urged against the cylinder with increasing force by partial frictional entrainment with the drum.

In such systems, a mechanism is generally employed to compensate for increase in the play of the brake, i.e. the stroke of the brakeshoes and/or the respective piston before the lining of the shoe fully bears against the braking face of the rotatable part; this mechanism may include a threaded spindle-and-sleeve arrangement stepped by a pawl upon excessive movement of the floating shoes or a frictional member in the wheel-brake cylinder adapted to advance the piston with respect to the cylinder housing. In still other arrangements, the frictional members are replaced by oppositely toothed telescoping members constituting the piston and adapted to be elongated and thereby advance the rest position of the force-transmitting link to compensate for brake-lining wear. These arrangements have the disadvantage that relatively complicated configurations must be imparted to the telescoping members by machining and finishing techniques so that self-adjusting mechanisms of this type are relatively expensive, prone to failure as a result of insufficient care in manufacture, and remain operative only as long as wear does not seriously alter the original dimensional tolerances.

It is, therefore, the principal object of the present invention to provide an improved self-adjusting mechanism for resetting the rest position of a brakeshoe to compensate for wear thereof in a hydraulically operable brake-actuating cylinder wherein the aforementioned disadvantages can be obviated.

Still another object of my invention is to provide a self-adjusting means for a wheel-brake cylinder of an automotive-vehicle brake system which is of relatively simple manufacture, low cost, has little tendency toward malfunction and affords long-term use with little propensity toward breakdown.

These objects and others which will become apparent hereinafter are attainable, in accordance with my present invention, by providing a spring ring received between a pair of relatively axially shiftable members including a spindle and a sleeve receiving this spindle, one of the mutually confronting peripheries of which is formed with a series of grooves or corrugations along its cylindrical surface. The nongrooved member is formed with a pair of axially spaced abutments receiving with axial play the spring ring which is resiliently biased to jump into the grooves between the axially spaced circumferential ridges while being engageable with lost motion by these abutments whose lost motion, i.e. the stroke of the abutment-carrying member between engagement with and disengagement from the ring, defines the predetermined play of the brakeshoes.

According to a more specific feature of this invention, the annular grooves or recesses are provided along an internal or external surface of an axially extending adjusting member affixed axially in the cylinder and coaxially and slidably received in the piston which is formed with axially spaced annular abutment shoulders forming a lost-motion connection with the ring which is resiliently retained in the grooves, the abutment engageable with the ring in the direction of movement of the piston for brake actuation being adapted to cam the ring from groove to groove to compensate for brake-lining wear, while the other abutment is formfitting about the ring and is of such configuration that it engages the ring upon release of the brake and prevents upon this engagement the radial movement of the ring out of the groove. To this end, the latter abutment is formed with an axially extending surface parallel to the grooved surface of the elongated member but spaced therefrom by a radial distance less than the radial thickness of the ring whose radial thickness exceeds the radial depth of the annular grooves.

Advantageously, the wheel-brake cylinder is used for a duplex-type brake having a pair of outwardly shiftable brakeshoes, the cylinder slidably receiving a pair of pistons and being provided with means for introducing the brake fluid into the cylinder between the pistons. In this case, the adjusting means comprises a pair of axially extending elongated members retained at an annular flange between a pair of retaining rings or disks at the center of the cylinder and extending axially outwardly in opposite directions into the respective pistons. The members may be integral, i.e. unitarily formed with one another, or may be individual rods and tubes with flanges secured in back-to-back relationship against axial movement by respective rings.

According to still another feature of this invention, the piston is provided with a socket-shaped member at its extremity facing forwardly in the direction of movement of the piston and accommodating the complementarily shaped connecting rod which operatively links the piston with its brakeshoe. The socket and connecting rod preferably forms a ball-like universal linkage. When the adjusting member is tubular and the piston has a rod received therein, this rod is preferably formed on the socket member.

The structure described above has the advantage that it defines the axial play of the brakeshoes and pistons invariably and accurately, permits of adjustment of the axial play by varying the distance between the abutment shoulder or the axial thickness of the ring, ensures a positive location of the brakeshoe in its new rest position, and is of inexpensive manufacture while being easily mounted in conventional cylinder structures.

The above and other objects, features and advantages of the present invention will become more readily apparent from the following description, reference being made to the accompanying drawing in which:

FIG. 3 is an axial cross-sectional view of another embodiment of this invention;

FIG. 4 is an enlarged detail view of the adjusting means of FIG. 3; and

FIG. 5 is an overall diagrammatic view of a wheel-brake assembly embodying the present invention.

Figure 1:
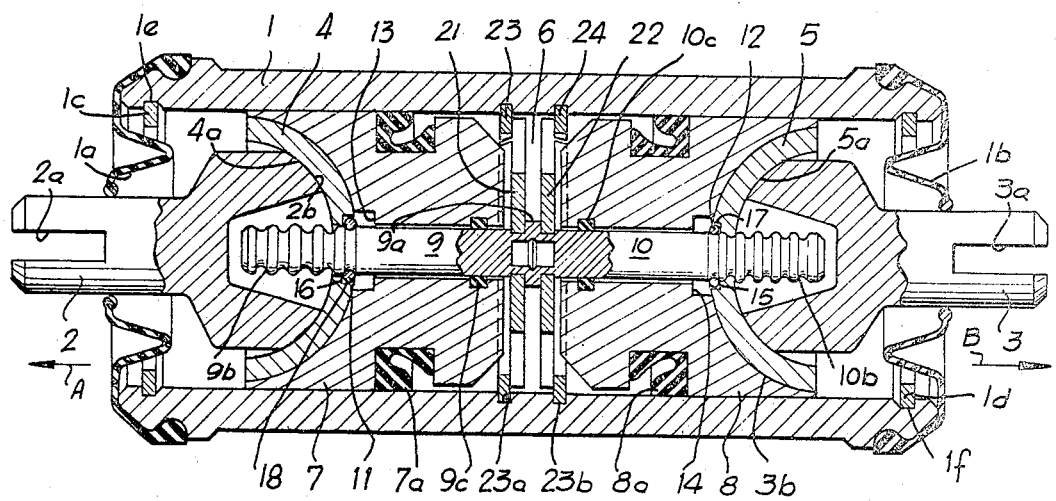
FIG. 1 is an axial cross-sectional view of a wheel-brake cylinder for a duplex-type internal-expansion brake.

Referring first to FIG. 5, it can be seen that a brake system according to the present invention comprises a master cylinder 50 which receives brake fluid from a reservoir 51 and forces it, upon depression of the brake pedal 52, through a line 53 to a wheel-brake cylinder 54 of either of the types illustrated in FIGS. 1–4. The wheel-brake cylinder here is shown to have a fitting 55 through which the brake fluid is fed to the interior of the cylinder between the brakeshoes 56 and 57 respectively acting upon the spines 58 and 59 of sectoral brakeshoes 60 and 61 which are hinged at 62 and 63 to the brake shield 64. The latter is affixed to a stationary part of the vehicle, e.g. the axle housing, in the usual manner. The brake drum can be affixed to the wheel disk by the usual wheel bolts and nuts. Springs 66 and 67 draw the brakeshoes 60 and 61, whose linings are represented at 68 and 69, inwardly away from the brake drum 65. A self-adjusting device 70, described in greater detail hereinafter with respect to FIGS. 1–4, is provided in the cylinder 54 to reset the position of the pistons 55 and 56, which are linked to the brakeshoes via rods 71 and 72, with wear of the brake linings 68 and 69. When the brake pedal 52 is depressed, hydraulic fluid is forced into cylinder 54 to shift the piston 56 to the left and the piston 57 to the right (FIG. 5), thereby bringing the brake lining 68 and 69 into contact with the drum 65. When the brake-lining wear increases the brake play, i.e. the normal brake stroke, the respective ring of self-adjusting means is stepped in the direction of brakeshoe advance and, when the brake is released, this ring establishes a new rest position of the brakeshoe by retaining the piston against the force of springs 66 and 67.

Figure 2:
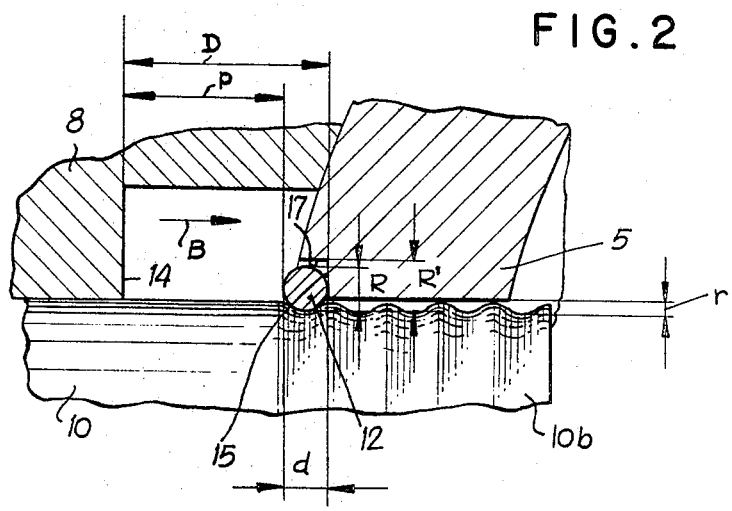
FIG. 2 is a detail view of the adjusting means of the cylinder of FIG. 1.

Referring now to FIGS. 1 and 2, it can be seen that the wheel-brake cylinder 1, whose fitting for introducing brake fluid is conventional and not illustrated here, slidably receives a pair of coaxially shiftable pistons 7 and 8 whose gland-type seals 7a and 8a, respectively, prevent leakage of hydraulic fluid beyond these pistons. The pistons 7a and 8a thus define with the cylinder 1 a brake-fluid compartment 6 which is pressurizable from the master cylinders (FIG. 5) to advance the pistons in the brake-actuating direction represented by arrows A and B. The outer ends of pistons 7 and 8, facing the respective brakeshoes and in the direction of the open ends of the cylinder 1, are provided with socket plates 4 and 5 of high wear and abrasion resistance which transfer force to the pressure rods 2 and 3 whose slots 2a and 3a receive the spines of the respective brakeshoes. Plates 4 and 5 are provided with axially outward spherical concavities 4a and 5a complementarily receiving the spheroidal portions 2b and 3b of the link members 2 and 3 so that a universal swivelling action is possible in the operative connection between the pistons and the brakeshoes. The surfaces 4a, 2b and 5a, 3b are retained in continuous contact by the restoring force of the springs (e.g. 66 and 67) drawing the brakeshoes inwardly. Elastic dust caps 1a and 1b close the opposite axial ends of the cylinder and tightly hub members 2 and 3 split spring rings 1c and 1d are received in respective recesses 1e and 1f at the ends of the cylinders 1 to form stops for the pistons 7 and 8.

The adjusting mechanism of the system of FIGS. 1 and 2 comprises a pair of male adjusting members 9 and 10 integral and unitarily formed with one another at a flange 9a and extending axially from the center of the cylinder 1 into the pistons 7 and 8. The members 9 and 10 have their outer peripheral surfaces formed, proximal to their extremities, with corrugations or grooves 9b and 10b, respectively, the grooves extending circumferentially around the members 9 and 10 and having radial depths r less than the radial thickness R of respective spring rings 11 and 12 which are intrinsically resiliently contractile to seat themselves in the grooves of each member. A seal 9c and 10c co-operates between the internal surface of the pistons 7 and 8 and the peripheral surface of member 9 or 10 to prevent the leakage of fluid from the compartment 6 past the pistons 7 and 8. The adjustment body 9 and 10 is mounted in the cylinder 1 between a pair of securing rings 22 and 23 axially flanking the flange 9a and retained against axial movement in the cylinder 1 by a pair of split lock rings 23 and 24 seated in respective grooves 23a and 23b of the internal wall of the cylinder 1. The piston members 7 and 8 into which the adjustment members 9 and 10 coaxially and slidably extend, are formed with respective abutments 13 and 14 engageable with the rings 11 and 12 upon advance of the pistons 7 and 8 in the direction of arrows A and B during brake actuation. Upon movement of the pistons 7 and 8 by springs 66 and 67, for example, the shoulders 15 and 16 engage the rings 12 and 11.

As can be seen in FIG. 2 for the right-hand adjustment mechanism, the shoulders 14 and 15 lie in planes perpendicular to the axis of the cylinder, the pistons and the members 9, 10, and are axially spaced apart by a distance D so as to define with the spring rings a brake play p or stroke equal to the difference between the axial spacing D and the axial thickness d of the spring ring. When the spring ring is of circular cross-section as illustrated in FIG. 2 and as is preferred for the purposes of the present invention, the thicknesses d and R are, of course, equal to the diameter of the ring cross-section.

Shoulder 14 is designed to engage the ring 12 upon advance of piston 8 in the direction of B in such manner as not to impede the camming movement of the ring 12 radially outwardly from the recess in which it originally is lodged and, therefore, entrain this ring forwardly whenever the actual brake play exceeds the stroke p determined by the lost-motion assembly 12, 14, 15. Upon disengagement of the brake, shoulder 15 engages the ring 12 but co-operates with an overhanging axially extending surface 17 of this shoulder which is in formfitting relationship to the ring 12, thereby preventing outward camming of the ring 12 and establishing this ring as a unidirectionally movable (arrow B) stop for the pistons 8, 5. This positive engagement by the pistons of the ring 12 is ensured by providing the surface 17 with a radial spacing R′ from the surface of the adjustment member which is less than the radial thickness R of the ring 12 but equal to or only slightly greater than the difference, $R-r$. The increase in the volume of chamber 6 is compensated by the usual increase of the volume of fluid in the brake system from the reservoir 51.

In the system of FIGS. 3 and 4, the duplex brake cylinder 101 receives a pair of spring rings 123 and 124 at an intermediate location between the pistons 107 and 108 which have sockets 104 and 105 receiving the pressure-transmitting members 102 and 103 as previously described. In this case, the elongated members 109 and 110 extending axially and slidably into the pistons 107 and 108 are tubular and have flanges 109' and 110' clamped between the securing rings 121 and 122 axially retained by the rings 123 and 124; at their extremities remote from the securing assembly 121 through 124 and the working chamber 106 between the pistons 107 and 108, the tubular members 109 and 110 are formed internally with axially-spaced grooves or recesses 109b and 110b. In this case, the spring rings 111 and 112 resiliently seated in these recesses are urged radially outwardly by their inherent elasticity and are advanced by the pistons 107 and 108 in the direction of arrows A' and B' by the shoulders 113 and 114 formed by the heads of bolts 119 and 120 respectively threaded into rods 104' and 105' of the sockets 104 and 105. The rods 104' and 105' extend axially into the tubular members 109 and 110 and can be considered part of the piston assemblies. The rings 111 and 112 are engageable with shoulders 115 and 116 whose configuration is such as to prevent the inward springing of the rings when the pistons 107 and 108 move axially inwardly to abut these rings and define therewith the rest positions of these pistons.

As can be seen from FIG. 4, the abutments 114 and 115 have an axial spacing D while the ring 112 has an axial thickness $d$ so that the play $p$ defined by the ring 112 is equal to the difference $D-d$. Furthermore, the recesses 110b have a radial depth $r$ less than the radial thickness R of the cross-section of this circular spring ring while an axially extending surface 117 or 118 lies along the periphery of the ring 111 or 112 at a radial distance R' from the surface of the adjusting members 109, 110 which may be equal to or slightly greater than the difference $R-r$ but which is smaller than the radial thickness R of the spring ring. Thus the shoulders 113 and 114 entrain the spring rings 111 and 112 to the left and right, when the brake wear exceeds the desired play $p$ by approximately the axial distance $a$ between the grooves and cam the rings into the next grooves, the rings then forming a stop for the piston when the brake is released. The axially extending surfaces 117 and 118, of course, prevent radially inward springing of the rings 111 and 112 during the stopping of the pistons.

I claim:

1. In a fluid-operated brake having at least one brakeshoe displaceable in the direction of a brake face rotatable relatively thereto, the improvement which comprises:
   a brake cylinder;
   a piston member shiftable in said brake cylinder;
   means operatively connecting said piston member with said brakeshoe; and
   adjusting means for re-establishing a predetermined brake play of said brakeshoe upon increase in said brake play with wear of said brakeshoe, said adjusting means including a further member having a surface extending in the direction of movement of said piston member and slidably confronting a corresponding surface thereof, at least one of said members being formed along its said surface with a multiplicity of annular recesses open toward the corresponding surface of the other member and spaced in the direction of movement of said piston member, and an annular spring ring resiliently biased radially toward said one of said members and having a radial height exceeding the depth of the recesses and being only partly receivable in said recesses while having a portion extending above said surface of said one of said members, the other of said members having a pair of annular shoulders spaced apart in the direction of movement of said piston member and forming a lost-motion assembly with said spring ring while defining therewith the normal brake play, the annular shoulder engageable with said spring ring upon advance of said brakeshoe in the direction of said face entraining said spring ring with freedom of resilient outward movement from said recesses to step said spring ring into a successive recess, the other annular shoulder engageable with said spring ring in the direction of movement of said brakeshoe away from said face having a configuration preventing outward movement of said spring ring from the recess in which it is received, said configuration including a first annular surface lying in a plane transverse to the axis of said one of said members and engageable with said spring ring, and an axially extending second annular surface overhanging the periphery of said ring upon engagement of the first annular surface therewith and spaced from said surface of said one of said members by a distance which is less than the radial thickness of said ring.

2. The improvement defined in claim 1 wherein said members are generally coaxial and said further member is a rod extending through said piston member and is formed with said recesses, said piston member being provided with said shoulders.

3. The improvement defined in claim 1 wherein said further member is a sleeve extending axially through said piston member and said piston member is provided with a rod received in said sleeve, said sleeve being formed internally with said recesses and said rod being provided with said shoulders.

4. The improvement defined in claim 1 wherein said one of said surfaces is an internal surface of said one of said members and said ring is biased resiliently outwardly, said shoulders being formed on an axially extending formation slidably received in said one of said members.

5. The improvement defined in claim 1 wherein said one of said surfaces is an external peripheral surface and said recesses are open radially outwardly, said ring being resiliently biased inwardly, said shoulders being formed along an internal bore slidably receiving said one of said members.

6. The improvement defined in claim 1 wherein said piston member is formed with an axially open socket slidably receiving the means for operatively connecting said brakeshoe with member, said socket being provided with one of said surfaces.

7. The improvement defined in claim 1 wherein a pair of piston members are axially shiftable in said cylinder and are each provided with a respective adjustment member of said adjustment means for controlling the play of a respective brakeshoe, said adjustment members being integral with one another, said adjustment means further comprising means between said piston members for supporting the integral adjustment members against axial movement in said cylinder.

8. The improvement defined in claim 1 wherein a pair of piston members are axially shiftable in said cylinder in opposite directions, each of said piston members being provided with a respective adjustment member of said adjusting means for controlling the play of a respective brakeshoe, said adjusting means further comprising retaining means between said pistons for preventing axial movement of the respective adjustment members.

9. The improvement defined in claim 1 wherein said recesses are formed between corrugations and have mutually divergent flanks of geometrically similar cross section.

References Cited

UNITED STATES PATENTS 2,404,326  7/1946  Taylor.

FOREIGN PATENTS 317,743  8/1929  Great Britain.

DUANE A. REGER, Primary Examiner

U.S. Cl. X.R.

188—79.5